Patented Aug. 2, 1949

2,478,154

UNITED STATES PATENT OFFICE 2,478,154

POLYMERIC ALDEHYDE DIESTERS AND PRODUCTION THEREOF

Theodore W. Evans, Oakland, Calif., assignor to Shell Development Company, San Francisco, Calif., a corporation of Delaware No Drawing. Application October 23, 1944, Serial No. 560,039

13 Claims. (Cl. 260—89.1)

This invention relates to new compounds and to their production by processes involving the polymerization of diesters of alpha,beta-unsaturated aldehydes.

Resinous substances can be produced by treating alpha-beta-unsaturated aldehydes with condensing agents such as acids or bases. Although the resins are sometimes called "polymers," they are actually the products of condensation and of addition to the carbonyl group, as well as of the more nearly "true" polymerization involving the linking together of a plurality of molecules through the unsaturated carbon-to-carbon linkage with a resulting and corresponding decrease in unsaturation.

We have now discovered the polymerization products of diesters of alpha-beta-unsaturated aldehydes and have found that the hydrolysis products thereof are substantially "true" polymers of alpha,beta-unsaturated aldehydes. We have further found that these new polymeric compounds make possible the production of other valuable resinous substances which have heretofore been unobtainable.

The unsaturated aldehyde diesters with which the invention is concerned may be represented by the general formula

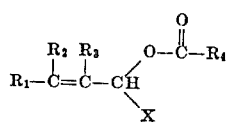

wherein X is a monovalent acid radical such as Cl, Br, OOCR$_5$, etc., R$_5$ representing a hydrogen atom, a hydrocarbon radical, a substituted hydrocarbon radical or a heterocyclic radical; and R$_1$, R$_2$, R$_3$ and R$_4$ are members of the group consisting of the hydrogen atom, hydrocarbon radicals, substituted hydrocarbon radicals and heterocyclic radicals.

The unsaturated aldehyde diesters may be produced conveniently by reacting an alpha,beta-unsaturated aldehyde with a carboxylic acid anhydride or carboxylic acid halide. Suitable alpha,beta-unsaturated aldehydes have a double bond of aliphatic character between two carbon atoms, one of which is attached directly to an aldehyde group. They may be straight chain or cyclic in character and may or may not contain one or more aromatic constituents. The most desirable aldehydes for the purposes of the present invention have a terminal methylene group attached directly by a double bond to a carbon atom which in turn is attached directly to an aldehyde group, as represented by the general formula

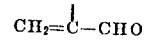

In general, aldehydes useful in the processes of the invention have not more than about 10 carbon atoms in the molecule. Examples of suitable alpha,beta-unsaturated aldehydes having a terminal methylene group are acrolein, alpha-methyl acrolein, alpha-ethyl acrolein, alpha-propyl acrolein, alpha-isobutyl acrolein, alpha-n-amyl acrolein, alpha-n-hexyl acrolein, alpha-bromo acrolein, etc. Examples of other alpha, beta-unsaturated aldehydes are crotonaldehyde, alpha - chlorocrotonaldehyde, beta - chlorocrotonaldehyde, alpha-bromocrotonaldehyde, beta-bromocrotonaldehyde, alpha,gamma - dichlorocrotonaldehyde, alpha,beta - dimethyl acrolein, alpha-methyl-beta-ethyl acrolein, alpha-methyl-beta-isopropyl acrolein, alpha-ethyl-beta-propyl acrolein and the compounds of the type best represented by the following structural formulas:

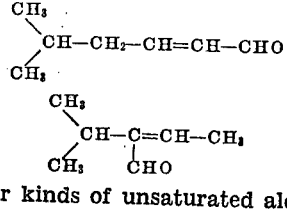

Many other kinds of unsaturated aldehydes can be used.

Suitable carboxylic acid anhydrides have the formula

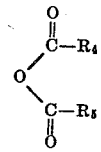

wherein R$_4$ and R$_5$ are as designated hereinbefore. It is to be understood that R$_4$ and R$_5$ may be linked together to form a divalent radical which is cyclic or acylic, i. e., the compound may be the anhydride of a mono- or a polycarboxylic acid which may be cyclic or acyclic. Suitable carboxylic acid anhydrides include acetic acid anhydride, propionic acid anhydride, butyric acid anhydride, benzoic acid anhydride, oxalic acid anhydride and acetic propionic acid anhydride. Among the many suitable carboxylic acid halides are acetyl chloride, acetyl bromide, propionyl chloride, propionyl bromide and the like and their homologues.

The reactions used in the production of the diesters may be conducted, if desired, in the presence of a catalyst. Examples of suitable catalysts are acids such as sulfuric acid, oxalic acid, etc., and metal halides such as stannous chloride, ferric chloride, stannic chloride, etc. In many cases a catalyst is not required. The reaction may or may not be effected in the presence of an inert diluent. Preferably the temperature is maintained below atmospheric temperature. Temperatures of from about 0° C. to about 20° C. have been found satisfactory. Other methods of production can be used. The aldehyde diesters may be separated from the other ingredients of the reaction mixture and purified by known or special methods. The compounds may often be polymerized without such separation.

Polymerization in accordance with the invention has been found to occur readily in the presence of a peroxide catalyst. The preferred catalyst is benzoyl peroxide, although substantially any catalyst which is active at the polymerization temperature employed may be used. Examples of other peroxide polymerization catalysts include acetyl peroxide, benzoyl acetyl peroxide, diacetyl peroxide, succinyl peroxide, tertiary butyl hydroperoxide, di(tertiary alkyl) peroxides such as di(tertiary butyl) peroxide, hydrogen peroxide and the like. Other oxygen-yielding polymerization catalysts may be used in some cases. An amount of catalyst equivalent to about 2% of peroxide by weight of polymerizable compound is satisfactory, although larger amounts, e. g. 10% or more, or smaller amounts, e. g. 1% or even less, may be used. In some cases, it may be desirable to polymerize in the concurrent presence of both a catalyst and an inhibitor of polymerization.

Polymerization of the more active diesters may be effected in the absence of known polymerization catalysts.

The temperatures employed in the polymerization may be selected with regard to the aldehyde and catalyst involved as well as with regard to the other ingredients of the reaction mixture and to the conditions under which the reaction is conducted. With the more reactive aldehydes such as acrolein, using a catalyst such as diacetyl peroxide or benzoyl peroxide, polymerization may occur at a significant rate at room temperature. The rate of polymerization increases with increasing temperature, however, and it is usually preferred to make use of temperatures between about 50° C. and about 150° C. At temperatures appreciably above the higher temperature stated the diester may decompose and the liberated aldehyde may condense with itself.

The reaction may be conducted in a continuous or batchwise manner. Atmospheric pressure is usually satisfactory, although superatmospheric pressures may be required in some cases or subatmospheric pressures may be desired. If desired, the reaction may be conducted in the absence of oxygen conveniently by providing a blanket of oxygen-free fluid such as nitrogen or carbon dioxide. Because of the ready reactivity of the aldehyde diesters and particularly because of the ease with which they are decomposed, e. g. hydrolyzed, it is preferred to polymerize in bulk (in the absence of diluents). If desired, however, solvents or non-solvent diluents may be present, particularly relatively inert organic liquids such as aliphatic or aromatic hydrocarbons.

The polymerization of a single aldehyde diester or of a mixture of such a diester with another diester of the same aldehyde (e. g. the copolymerization of acrolein diacetate with acrolein dipropionate) yields a product which, on hydrolysis, gives a polymeric aldehyde having in the polymer molecule substantially the same repeating units. Aldehyde polymer molecules containing two or more different repeating units may be produced by the hydrolysis of the products obtained by copolymerizing diesters of two or more different alpha,beta-unsaturated aldehydes. Novel products can be obtained by the copolymerization of one or more unsaturated aldehyde diesters with one or more other polymerizable unsaturated compounds.

The polymeric aldehyde diesters may be liquid or solid depending upon the nature of the starting aldehyde and upon the degree of polymerization. The relatively high molecular weight polymers of the short-chain aldehydes are hard, brittle solids. Polymers of the higher aldehydes are somewhat less hard for a given polymerization degree. Polymers varying from but two or three monomer units (polymerization degree) to ten and more may be obtained. Polymers having a polymerization degree of at least six are preferred.

Hydrolysis of the polymeric aldehyde diesters should be effected with care where it is desired to obtain a polymeric aldehyde substantially free from cross-linking and containing substantially the theoretical number of carbonyl groups. It has been found that, if too vigorous hydrolysis conditions are employed, cross-linking involving the carbonyl groups may occur, with resulting reduction in the solubility and fusibility of the polymer. Hydrolysis may be satisfactorily carried out, however, at relatively low temperatures in the absence of an added hydrolysis catalyst or in the presence of a very mild hydrolysis catalyst. Substantially any known hydrolysis catalyst may be used. Strong mineral acids such as sulfuric and hydrochloric acids and strong bases are effective in promoting the reaction. Suitable bases include hydroxides, oxides, carbonates and other salts of weak acids of alkali or alkaline earth metals or mixtures thereof. Dilute aqueous solutions, e. g. aqueous solutions containing from about 0.1% to about 5% of acid or base, are preferred. An homogenizing agent such as an organic solvent, which may be an alcohol, ketone, aliphatic or aromatic hydrocarbon, may be present to maintain the polymer in solution. Hydrolysis is hastened by elevated temperatures. Reflux temperatures may be employed. Hydrolysis may be effected by refluxing with aqueous liquids in the absence of added hydrolysis catalyst. Where cross-linking at this point is not undesirable, hydrolysis may be effected under more vigorous conditions, employing stronger concentrations of hydrolysis catalyst and, if desired, more vigorous heating.

The polymeric aldehyde may be separated from the other ingredients of the hydrolysis mixture and purified by known or special methods. Insoluble material may be separated by filtration, centrifuging, degradation or the like. Soluble acids, bases and salts are conveniently removed by ion exchange resins. Readily soluble substances may be removed by distillation, preferably under reduced pressures.

The polymeric aldehydes produced by hydrolysis of the polymeric aldehyde diesters under mild conditions consist essentially of a plurality of monomeric aldehyde molecules joined together through their unsaturated carbon-to-carbon linkages with a corresponding reduction in unsaturation. Polymeric aldehydes may be produced which have substantially the theoretical number of unreacted aldehyde carbonyl groups. The polymeric aldehydes have approximately the same degree of polymerization as the polymeric aldehyde diesters from which they were produced. Polymerization degrees of from 2 to about 10 are common, although much higher polymers may be produced. In general, the polymers are solid substances varying in color from water-white to brown. They are generally less readily soluble in inert organic liquids than the corresponding diesters.

The polymeric aldehydes are very reactive compounds. They may be readily converted to resinous gels substantially insoluble in common organic solvents. The conversion, which may occur spontaneously on standing, is accelerated by the presence of dilute acids, bases or the like. The insoluble resinous gels may be infusibilized by heating, infusibilization being accelerated by the presence of air, peroxides, acids, bases or salts. The polymeric aldehydes thus may be used in the production of coatings, castings, laminated articles, impregnating compositions and the like. The insoluble fusible material may be employed in molding operations.

The polymeric aldehydes may be condensed with phenols yielding new phenol-aldehyde resins. The condensation is readily effected by heating a mixture of the polymer and a phenol preferably in the presence of an homogenizing agent such as a mutual solvent desirably in the presence of a condensation catalyst such as an acid or base. Other aldehydes may be present at the same time if desired and one or a plurality of phenols may be employed. In the condensation the usual A, B and C stages may be recognized. In general, the methods which have been found satisfactory in the production of other phenol-aldehyde resins are useful in the production of these new phenol-aldehyde resins. The new phenol-aldehyde resins may be used in coating, impregnating and molding compositions, for the production of laminated articles, in the production of castings and the like. The polymeric aldehydes of the invention may be condensed with amides such as urea and amines such as aniline in the production of aminoplast resins.

Particularly valuable products in accordance with the invention are the acetals of the new polymeric aldehydes. The acetals may be produced by reacting the polyaldehyde with one or more alcohols. The alcohols may be monohydric or polyhydric. They are preferably aliphatic in character and may be acyclic or cyclic. They may contain one or more aromatic substituents. They may be saturated or unsaturated. Representative examples of suitable alcohols are methyl alcohol, ethyl alcohol, propyl alcohol, allyl alcohol, methallyl alcohol, chloroallyl alcohol, crotyl alcohol, tiglyl alcohol, cinnamyl alcohol, ethylene glycol, glycerol, polyglycerols, pentaerythritol, polypentaerythritol, polyvinyl alcohol, polyallyl alcohol, etc. Instead of alcohols themselves, acetal-forming derivatives thereof may be employed. Instead of first producing and isolating the polymeric aldehyde the acetals may be more readily produced by reacting the alcohol or acetal-forming derivative thereof with the polymeric aldehyde diester. Catalysts such as strong acids may be present in weak concentration. These new acetals may be employed in the production of self-sustaining films, in the production of packaging materials, as interlayers and impregnants for laminates, as molding materials, etc. Many of the new acetals, particularly the acetals of unsaturated alcohols, may be readily infusibilized, a procedure which is promoted by the presence of driers and vulcanizing agents.

By hydrogenation under mild conditions, preferably at relatively low temperatures, the polymeric aldehyde diesters may be converted to the corresponding polymeric allyl-type esters. Thus, polymeric acrolein diacetate, on careful hydrogenation, yields polyallyl acetate.

Polymeric allyl-type alcohols may be produced by the hydrogenation of the new monomeric aldehydes. Thus by the hydrogenation of polymeric acrolein produced in accordance with the invention, polymeric allyl alcohols may be produced. Hydrogenation may be effected by any known or special methods, conveniently by treating with gaseous hydrogen under pressure at an elevated temperature, e. g. 150° to 250° C., in the presence of a hydrogenation catalyst such as Raney nickel or the like. Polymeric allyl-type alcohols cannot be obtained by the hydrogenation of so-called "polymeric aldehydes" produced by subjecting an unsaturated aldehyde to polymerization conditions.

Some of the many ways in which the invention can be carried out are illustrated by the following examples.

*Example I*

A solution of 1.5 parts of stannous chloride in 800 parts of acetic anhydride was cooled with dry ice. Acrolein, 378 parts, was added rapidly. The mixture was stirred vigorously and kept at below −15° C. during the addition. After about 8 hours the mixture was allowed gradually to warm up to room temperature. It was then poured into 1000 parts of ice containing 3.8 parts of concentrated hydrochloric acid. The ice was allowed to melt. The mixture was shaken thoroughly and the two phases allowed to separate. The aqueous layer was washed with isopropyl ether, filtered, dried and subjected to distillation. The crude distillate having a boiling point of 85° C. to 88° C. at 20 mm. pressure consisted principally of acrolein diacetate.

Benzoyl peroxide, 2 parts, was added to 238 parts of the crude acrolein diacetate. The mixture was placed in a glass vessel which was then closed and placed in an oven maintained at 70° C. for 2½ hours, at the end of which time the temperature of the mixture had been carried to 150° C. by exothermic reaction. The refractive index (20/D) of the mixture was 1.4434. The glass vessel was removed from the oven and cooled to 70° C., at which temperature it was maintained for 41 hours, at the end of which time the refractive index (20/D) of the viscous liquid was 1.4445. The liquid was subjected to vacuum distillation to remove the readily volatile material. The residue was a light yellow, brittle solid, soluble in ethyl alcohol, acetone and benzene. It had a molecular weight (ebullioscopic in benzene) of about 1400 corresponding to a polymerization degree of about 9.

*Example II*

Stannous chloride, 1.7 parts, was dissolved in acetic anhydride, 816 parts. The solution was cooled to below −15° C. Methacrolein, 420 parts, of 95% purity was added rapidly to the mixture with stirring. The reaction was effected under conditions similar to those used in the preparation of acrolein diacetate in accordance with Example I. The product was dried over sodium sulfate and distilled. The crude methacrolein diacetate had a boiling point of 80° C. to 81° C. at 10 mm. pressure. The yield of crude methacrolein diacetete was 603 parts.

Methacrolein diacetate was polymerized to a light-colored solid under the influence of benzoyl peroxide in a manner similar to that used for the polymerization of acrolein diacetate in accordance with Example I.

*Example III*

Tertiary butyl hydroperoxide, 1.5 parts, was added to acrolein diacetate, 204 parts. The solution was held at 100° C. for 5.5 hours. The temperature was then raised to 116° C., whereupon the exothermic polymerization reaction carried the temperature to 130° C. At the end of 2 hours the refractive index (20/D) was 1.4528. The viscous product was then subjected to vacuum distillation to remove the readily volatile material. The residue, consisting essentially of polymeric acrolein diacetate, had a softening point of about 80° C.

*Example IV*

Polymeric acrolein diacetate, 54.2 parts, obtained in accordance with Example I was dissolved in ethyl alcohol, 592 parts, and benzene, 220 parts. A 10% aqueous solution of sodium hydroxide was then added slowly with stirring over a period of several days. After 27.4 parts of sodium hydroxide had been added, a very small amount of polymer became insoluble in the mixture due to cross-linking and precipitating. The reaction mixture was neutralized with acetic acid and filtered. The sodium acetate dissolved in the filtrate was removed by contacting the filtrate with a base exchange resin, followed by contact with an acid absorbing resin. The liquid was then subjected to vacuum distillation, the material volatile at below about 50° C. being removed. The residue was polymeric acrolein, a granular solid, slightly brownish in color, soluble in a mixture of water and acetone, but insoluble in either water or acetone alone.

*Example V*

Polymeric acrolein diacetate, 30 parts, obtained in accordance with Example I was dissolved in 1,4-dioxane, 404 parts. Concentrated HCl, 1.3 parts, was added. The solution was heated to reflux temperature, whereupon water, 180 parts, was added, the amount of water being just sufficient to bring the polymeric acrolein diacetate to the point of incipient precipitation. The solution was allowed to reflux gently for 18 hours, at the end of which time 83% of the theoretical amount of acetic acid had been liberated. The water, solvent and acetic acid were removed by distillation under reduced pressure. The residue was polymeric acrolein.

*Example VI*

Polymeric acrolein obtained in accordance with Example IV was dissolved in a mixture of water and acetone. A small amount of sodium hydroxide was added. The mixture was heated until partially cross-linked polymeric acrolein precipitated as a brown gel. The gel was spread upon a metal plate which was placed in an oven and baked at about 70° C., whereupon the coating became infusibilized.

*Example VII*

Polymeric acrolein diacetate, 49.5 parts, obtained in accordance with Example I was heated in admixture with methyl alcohol, 399 parts, and concentrated hydrochloric acid, 1.3 parts, with the continuous removal of a methyl acetate-methyl alcohol azeotrope. At the end of 12 hours the remaining methyl alcohol was removed by distillation under reduced pressure. The non-volatile material was a methyl acetal of polymeric acrolein. A yield of 26 parts of the acetal was obtained. The acetal was soluble in acetone. An acetone solution of the acetal was used in coating a metal plate. The acetone was removed by evaporation. The coated plate was heated in an oven at 155° C., whereupon a hard, scratch-resistant coating was obtained.

*Example VIII*

Methacrolein diacetate, 290 parts, was mixed with tertiary butyl hydroperoxide (a commercial product containing tertiary butyl hydroperoxide, 60% to 65%, di(tertiary butyl) peroxide, 5% to 20%, and tertiary butyl alcohol, 15° to 35%), 2.9 parts, and heated in a sealed glass vessel for 9½ hours at 115° C., then for 24 hours at 125° C. The refractive index of the mixture increased from an initial value of 1.4244 to a final value of 1.4303. Volatiles were removed by vacuum distillation. The residue was a red-brown solid polymeric methacrolein diacetate.

*Example IX*

Polymeric acrolein diacetate (produced in accordance with Example I), 25 parts, dissolved in dioxane, 225 parts, was placed in a steel pressure vessel and hydrogenated in the presence of approximately 2 parts of Raney nickel which had been washed with iso-octane. The initial hydrogen pressure was 970 p. s. i. The temperature was raised to 225° C., at which the pressure was 1500 p. s. i. Approximately .45 mole of hydrogen was absorbed for each mole of monomeric acrolein diacetate (combined in polymeric form). The hydrogenated solution was light yellow in color. 600 parts of water were added to the solution, whereupon an emulsion was formed which was broken by the addition of sodium chloride. The resulting two phases were separated. The aqueous layer was extracted three times with allyl acetate. The allyl acetate extract was combined with the non-aqueous layer. The allyl acetate was removed by distillation under reduced pressure. The residue was a brown solid having the following analysis:

Acidity, eq./100 g _____ 0.028
Ester value, eq./100 g _____ 0.512
Acetyl value, eq./100 g _____ 0.076

The term "unsaturated" as used herein refers to carbon-to-carbon unsaturation of aliphatic character. The term "polymerization" refers to polymerization through carbon-to-carbon unsaturation.

I claim as my invention:

1. Homopolymeric methacrolein diacetate.
2. A homopolymer of an acrolein diester of a saturated fatty acid of two to four carbon atoms.
3. A homopolymer of the diester of a saturated fatty acid of two to four carbon atoms and an aliphatic alpha,beta-monoolefinic monoaldehyde having the beta-carbon atom as the carbon atom of a terminal methylene group.
4. A process for producing homopolymer from the diester of a saturated fatty acid of two to four carbon atoms and an aliphatic alpha,beta-monoolefinic monoaldehyde having the beta-carbon atom as the carbon atom of a terminal methylene group, which comprises heating said diester as sole polymerizable compound at 50° C. to 150° C. in the presence of a peroxide polymerization catalyst.

5. A process for producing homopolymer from the acrolein diester of a saturated fatty acid of 2 to 4 carbon atoms which comprises heating said diester as sole polymerizable compound at 50° C. to 150° C. in the presence of 0.1 to 10% of a peroxide polymerization catalyst.

6. A process for producing a homopolymer which comprises heating acrolein diacetate as sole polymerizable compound at 50° C. to 150° C. in the presence of about 2% benzoyl peroxide.

7. A process for producing homopolymer which comprises heating methacrolein diacetate as sole polymerizable compound at 50° C. to 150° C. in the presence of about 2% benzoyl peroxide.

8. A polymerized allylidene diethoxide.

9. A homopolymerized allylidene diacetate.

10. A substance from the group consisting of (1) a homopolymer of a diester of a saturated fatty acid of two to four carbon atoms and an aliphatic alpha,beta-monoolefinic monoaldehyde having the beta-carbon atom as the carbon atom of a terminal methylene group, and (2) a polymer of the acetal of an alpha,beta-monoolefinic monoaldehyde and a monohydric alcohol.

11. A polymer of the acetal of an alpha,beta-monoolefinic monoaldehyde and an aliphatic monohydric alcohol.

12. A polymer of the acetal of an aliphatic saturated monohydric alcohol and an alpha,beta-monoolefinic monoaldehyde having the beta-carbon atom as the carbon atom of a terminal methylene group.

13. Polymerized allylidene dialkoxide.

THEODORE W. EVANS.

REFERENCES CITED

The following references are of record in the file of this patent:

UNITED STATES PATENTS

| Number | Name | Date |
|---|---|---|
| 1,625,852 | Herrmann | Apr. 26, 1927 |
| 1,746,665 | Matheson | Feb. 11, 1930 |
| 2,178,523 | Schmidt | Oct. 31, 1939 |
| 2,312,193 | Richter | Feb. 23, 1943 |
| 2,332,896 | D'Alelio | Oct. 16, 1943 |
| 2,341,306 | Agre | Feb. 8, 1944 |
| 2,341,334 | Richter | Feb. 8, 1944 |
| 2,356,767 | Kropa | Aug. 29, 1944 |
| 2,400,727 | Yale | May 21, 1946 |
| 2,404,929 | Seymour | July 30, 1946 |
| 2,417,404 | Minsk | Mar. 11, 1947 |
| 2,443,167 | Minsk | June 8, 1948 |

FOREIGN PATENTS

| Number | Country | Date |
|---|---|---|
| 102,849 | Sweden | Oct. 31, 1941 |
| 340,008 | Great Britain | Dec. 19, 1930 |
| 369,313 | Great Britain | Mar. 24, 1932 |
| 449,115 | Germany | Sept. 3, 1927 |
| 592,233 | Germany | Feb. 3, 1934 |
| 679,944 | Sweden | Aug. 16, 1939 |